United States Patent
Oguchi

(10) Patent No.: US 9,523,475 B2
(45) Date of Patent: Dec. 20, 2016

(54) REAR COMBINATION LAMP FOR VEHICLE

(71) Applicant: HONDA MOTOR CO., LTD., Minato-Ku, Tokyo (JP)

(72) Inventor: Tsuyoshi Oguchi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/779,894

(22) PCT Filed: Mar. 26, 2014

(86) PCT No.: PCT/JP2014/058572
§ 371 (c)(1),
(2) Date: Sep. 24, 2015

(87) PCT Pub. No.: WO2014/157354
PCT Pub. Date: Oct. 2, 2014

(65) Prior Publication Data
US 2016/0053960 A1    Feb. 25, 2016

(30) Foreign Application Priority Data
Mar. 28, 2013    (JP) ................. 2013-070175

(51) Int. Cl.
*F21S 8/10*    (2006.01)
*B60Q 1/26*    (2006.01)
(Continued)

(52) U.S. Cl.
CPC ......... *F21S 48/2212* (2013.01); *B60Q 1/2607* (2013.01); *B60Q 1/30* (2013.01);
(Continued)

(58) Field of Classification Search
CPC .. F21S 48/2212; F21S 48/215; F21S 48/2206; F21S 48/232; B60Q 1/2607; B60Q 1/30; B60Q 1/34
See application file for complete search history.

(56) References Cited

U.S. PATENT DOCUMENTS 4,860,174 A * 8/1989 Kato .................... B60Q 1/2607
                                                              362/307
5,055,983 A * 10/1991 Hunold ................ B60Q 1/2607
                                                              362/243
(Continued)

FOREIGN PATENT DOCUMENTS

JP    H02-101405 U    8/1990
JP    2005-085494 A    3/2005
(Continued)

Primary Examiner — Mary Ellen Bowman
(74) Attorney, Agent, or Firm — Carrier Blackman & Associates, P.C.; Joseph P. Carrier; William D. Blackman

(57) ABSTRACT

In a rear combination lamp for a vehicle in which a tail lamp light source and a stop lamp light source are covered from the rear of the vehicle with an outer lens, the tail lamp light source and the stop lamp light source are covered with a first inner lens, and a second inner lens that is subjected to processing so as to have a lower light transmittance than that of the first inner lens and so that diffused light is formed for covering the first inner lens from the rear of the vehicle in a region in which at least the first inner lens and the tail lamp light source overlap when viewed from the rear of the vehicle while avoiding a region in which at least the first inner lens and the stop lamp light source overlap when viewed from the rear of the vehicle.

9 Claims, 9 Drawing Sheets

(51) Int. Cl.
*B60Q 1/30* (2006.01)
*B60Q 1/34* (2006.01)

(52) U.S. Cl.
CPC .............. *B60Q 1/34* (2013.01); *F21S 48/215* (2013.01); *F21S 48/2206* (2013.01); *F21S 48/232* (2013.01)

(56) References Cited

U.S. PATENT DOCUMENTS

| | | | | |
|---|---|---|---|---|
| 5,526,247 | A * | 6/1996 | Sugiyama | B60Q 1/2607 362/268 |
| 5,658,072 | A * | 8/1997 | Natsume | F21S 48/2212 362/309 |
| 5,692,824 | A * | 12/1997 | Ooishi | B60Q 1/2607 362/240 |
| 6,652,130 | B2 * | 11/2003 | Mochizuki | B60Q 1/0683 362/277 |
| 2003/0227781 | A1 * | 12/2003 | Mochizuki | B60Q 1/0058 362/517 |
| 2005/0068781 | A1 | 3/2005 | Nakayama et al. | |

FOREIGN PATENT DOCUMENTS

| | | | |
|---|---|---|---|
| JP | 2007-203828 A | 8/2007 | |
| JP | 2010-135198 A | 6/2010 | |
| JP | 2011-222377 A | 11/2011 | |
| WO | 03/035457 A1 | 5/2003 | |

* cited by examiner

REAR COMBINATION LAMP FOR VEHICLE

TECHNICAL FIELD

The present invention relates to a rear combination lamp for a vehicle in which a tail lamp light source and a stop lamp light source disposed above the tail lamp light source are covered from the rear of the vehicle with an outer lens that is common to the light sources.

BACKGROUND ART

A rear combination lamp for a vehicle in which a tail lamp light source and a direction indicator light source are covered from the rear of the vehicle with a red inner lens in the interior of an outer lens is known from Patent Document 1.

RELATED ART DOCUMENTS

Patent Documents

Patent Document 1: International Patent Publication Laid-open No. WO2003/035457

SUMMARY OF THE INVENTION

Problems to be Solved by the Invention

In the arrangement disclosed in Patent Document 1 above, light from the tail lamp light source and light from the direction indicator light source, which have different light intensities, are transmitted by a common inner lens and shine rearward. Because of this, a driver in a vehicle behind determines the difference between a stop lamp and the tail lamp based only on the light intensity, and there is a desire for differentiation between the stop lamp and the tail lamp being turned on to be possible using a factor other than the light intensity, thus enhancing the visibility.

The present invention has been accomplished in light of such circumstances, and it is an object thereof to provide a rear combination lamp for a vehicle that enables the turning on of a stop lamp to be made more clearly visible by a factor other than the light intensity.

Means for Solving the Problems

In order to attain the above object, according to a first aspect of the present invention, there is provided a rear combination lamp for a vehicle in which a tail lamp light source and a stop lamp light source disposed above the tail lamp light source are covered from the rear of the vehicle with an outer lens that is common to the light sources, characterized in that a first inner lens that covers from the rear of the vehicle the tail lamp light source and the stop lamp light source, the first inner lens being common to the light sources, and a second inner lens that is subjected to processing so as to have a lower light transmittance than that of the first inner lens and so as to diffuse light are disposed within the outer lens, and the second inner lens is formed so as to cover the first inner lens from the rear of the vehicle in a region in which at least the first inner lens and the tail lamp light source overlap when viewed from the rear of the vehicle while avoiding a region in which at least the first inner lens and the stop lamp light source overlap when viewed from the rear of the vehicle.

Further, according to a second aspect of the present invention, in addition to the first aspect, a frame member that partitions from each other a stop lamp region in which light from the stop lamp light source is transmitted only by the first inner lens and goes toward the outer lens side and a tail lamp region in which light from the tail lamp light source is transmitted by the first and second inner lenses and goes toward the outer lens side is disposed within the outer lens.

According to a third aspect of the present invention, in addition to the second aspect, the second inner lens is partitioned into an upper lens portion and a lower lens portion by the frame member.

According to a fourth aspect of the present invention, in addition to any one of the first to third aspects, a surface, on the tail lamp light source side, of the second inner lens is subjected to grained texturing.

According to a fifth aspect of the present invention, in addition to the second aspect, a direction indicator region is formed on the left and right of the tail lamp region within the outer lens, the direction indicator region being partitioned from the stop lamp region and the tail lamp region by the frame member, and a direction indicator light source being disposed in each direction indicator region.

According to a sixth aspect of the present invention, in addition to the second or third aspect, the upper lens portion of the second inner lens is formed so as to follow a lower edge of the stop lamp region.

Moreover, according to a seventh aspect of the present invention, in addition to the fifth aspect, the lower lens portion of the second inner lens is formed into a line shape extending in a left-and-right direction, and a direction indicator formed from the direction indicator light source and the outer lens is formed into a substantially triangular shape so as to make opposite end parts of the lower lens portion close to a middle part of one side of the triangle when viewed from the rear of the vehicle.

Effects of the Invention

In accordance with the first aspect of the present invention, since light from the tail lamp light source is transmitted by the first inner lens, the second inner lens, which has been subjected to processing so as to have a lower light transmittance than that of the first inner lens and so as to diffuse light, and the outer lens and shines rearward, and light from the stop lamp light source is transmitted by the first inner lens and the outer lens and shines rearward, it is therefore possible for the stop lamp to shine rearward in a manner different from that of the tail lamp and for turning on of the stop lamp and the tail lamp to be clearly differentiated by a factor other than the light intensity, thus enhancing the visibility.

Furthermore, in accordance with the second aspect of the present invention, since the frame member partitions the stop lamp region, in which light from the stop lamp light source is transmitted only by the first inner lens and goes toward the outer lens side, from the tail lamp region, in which light from the tail lamp light source is transmitted by the first and second inner lenses and goes toward the outer lens side, it is possible to clearly differentiate the tail lamp and the stop lamp, and it is possible for a driver in a vehicle behind to clearly distinguish the tail lamp from the stop lamp.

In accordance with the third aspect of the present invention, since the second inner lens is partitioned into the upper lens portion and the lower lens portion, it is possible to make it appear as if there are two tail lamps, that is, an upper one and a lower one, thus enhancing the appearance.

In accordance with the fourth aspect of the present invention, due to the surface, on the tail lamp light source side, of the second inner lens being subjected to grained texturing, it is possible for light from the tail lamp light source to be transmitted by the second inner lens and be diffused, thus making the entire second inner lens shine.

In accordance with the fifth aspect of the present invention, since the direction indicator light sources are each disposed in the direction indicator regions, which are separated from the stop lamp region and the tail lamp region and are formed on the left and right of the tail lamp region, it is possible to form the direction indicators so that they are clearly different from the stop lamp and the tail lamp, and a driver in a vehicle behind can easily see that the direction indicators are turned on.

In accordance with the sixth aspect of the present invention, since the upper lens portion of the second inner lens follows the lower edge of the stop lamp region, it is possible to emphasize the stop lamp by the upper lens portion, thus enhancing the visibility of the stop lamp.

In accordance with the seventh aspect of the present invention, since the direction indicator is formed into a substantially triangular shape when viewed from the rear, and the lower lens portion of the second inner lens extends linearly in the left-and-right direction so that opposite end parts are close to a middle part of one side of the triangle of the direction indicator, it is possible to form an arrow-like shape from the lower lens portion and the direction indicator, thus enabling the direction indicator be easily seen when they are turned on.

EXPLANATION OF REFERENCE NUMERALS AND SYMBOLS

Figure 1:
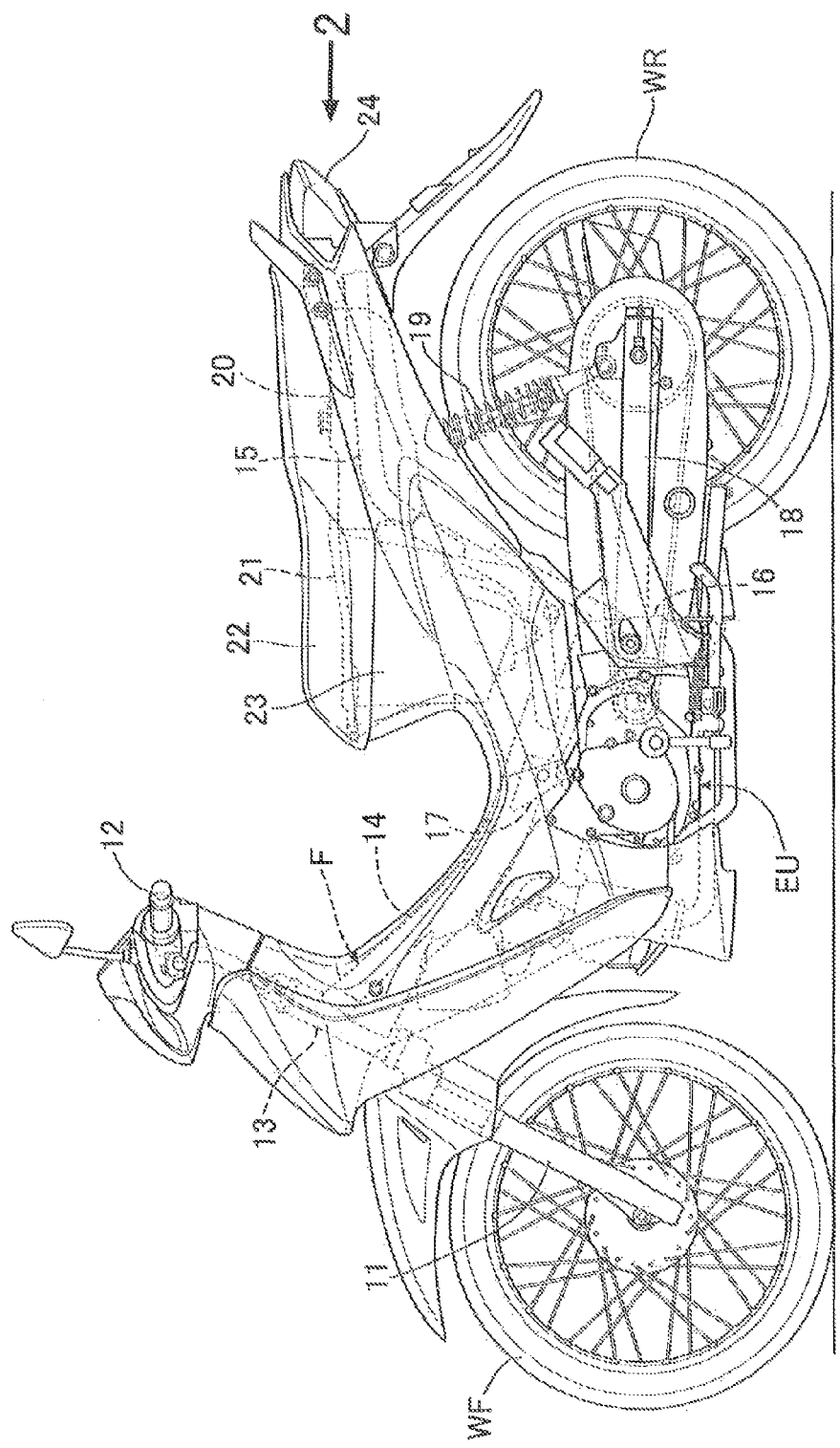
FIG. 1 is a side view of a two-wheeled motor vehicle. (first embodiment)

24 Rear combination lamp
28 Direction indicator
33A, 33B Tail lamp light source
31 Outer lens
34 Stop lamp light source
38 Frame member
39 First inner lens
40 Second inner lens
40a Upper lens portion
40b Lower lens portion
49 Stop lamp region
50 Tail lamp region
54 Direction indicator region
55 Direction indicator light source

MODES FOR CARRYING OUT THE INVENTION

An embodiment of the present invention is explained by reference to the attached FIG. 1 to FIG. 9. In the explanation below, front-to-rear, left-to-right, and top-to-bottom are defined as directions as viewed by a person riding a two-wheeled motor vehicle.

First Embodiment

First, in FIG. 1, a vehicle body frame F of a two-wheeled motor vehicle as a vehicle includes a head pipe 13 that steerably supports a front fork 11 axially supporting a front wheel WF and handlebars 12 linked to the upper end of the front fork 11, a main frame 14 that extends downward to the rear from the head pipe 13, a pair of left and right rear frames 15 that are connectedly provided in a rear part of the main frame 14 and extend upward to the rear, and a pivot frame 16 that is connectedly provided in a rear end part of the main frame 14 and extends to the rear.

An engine unit EU is disposed beneath the main frame 14, and this engine unit EU is supported by the pivot frame 16 and a hanger plate 17 secured to an intermediate part of the main frame 14.

Vertically swingably supported on the pivot frame 16 is a front end part of a swing arm 18 axially supporting a rear wheel WR via a rear end part, a rear cushion unit 19 being provided between the swing arm 18 and the rear frame 15. Furthermore, a fuel tank 20 is disposed above the rear wheel WR so as to be supported by the rear frame 15, and a storage box 21 supported by the rear frame 15 is disposed in front of the fuel tank 20.

Mounted on the vehicle body frame F is a vehicle body cover 23, made of a synthetic resin, covering the vehicle body frame F, and disposed on a rear part of the vehicle body cover 23 is a tandem type riding seat 22 covering the storage box 21 and the fuel tank 20 from above so that the riding seat 22 can be opened and closed.

A rear combination lamp 24 in accordance with the present invention is disposed on a rear end part of the vehicle body cover 23 to the rear of the riding seat 22.

Figure 2:
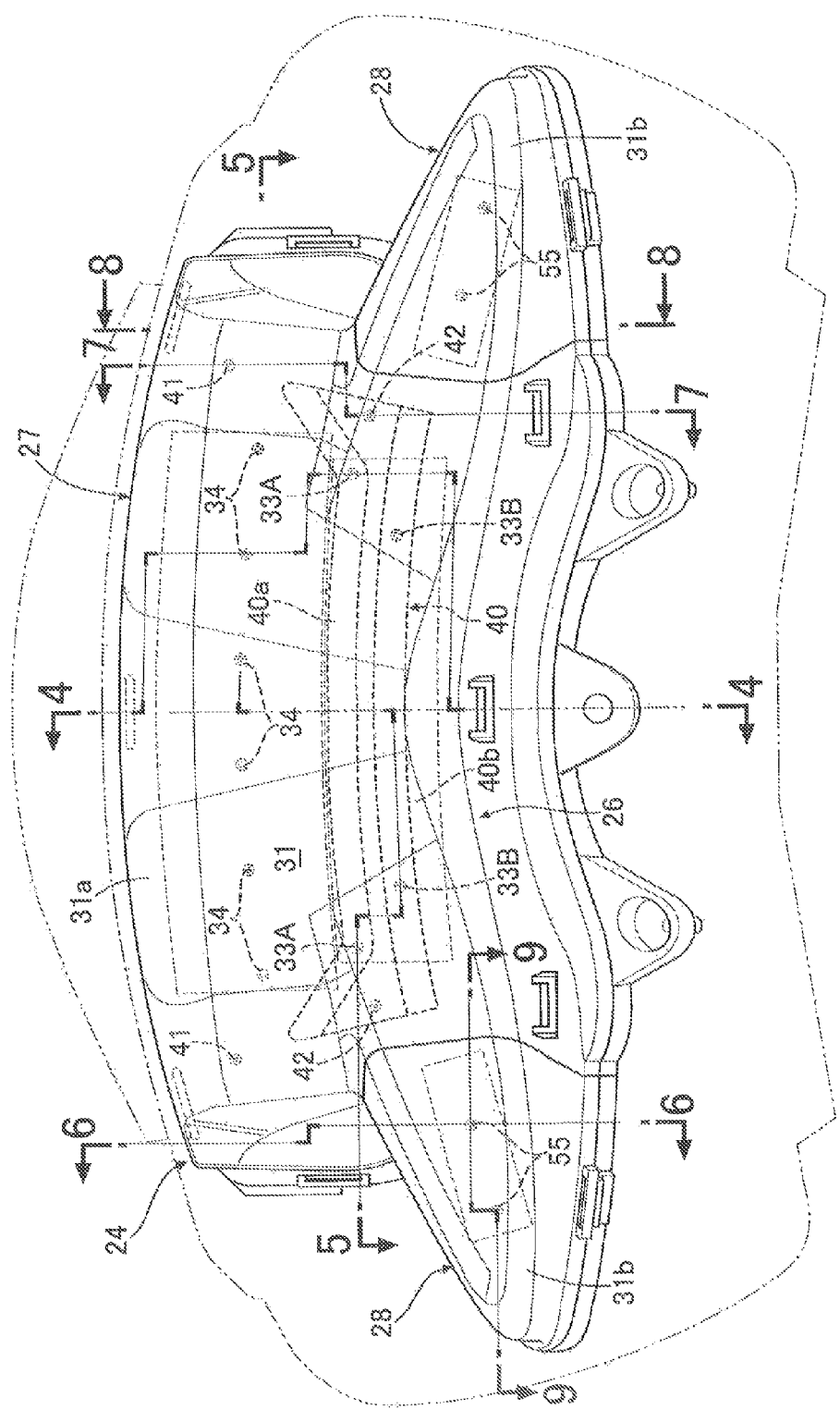
FIG. 2 is a view when a rear combination lamp is viewed from the direction of arrow 2 in FIG. 1. (first embodiment)

In FIG. 2, the rear combination lamp 24 includes a tail lamp 26, a stop lamp 27 disposed above the tail lamp 26, and direction indicators 28 and 28 disposed on left and right sides of the tail lamp 26.

Figure 3:
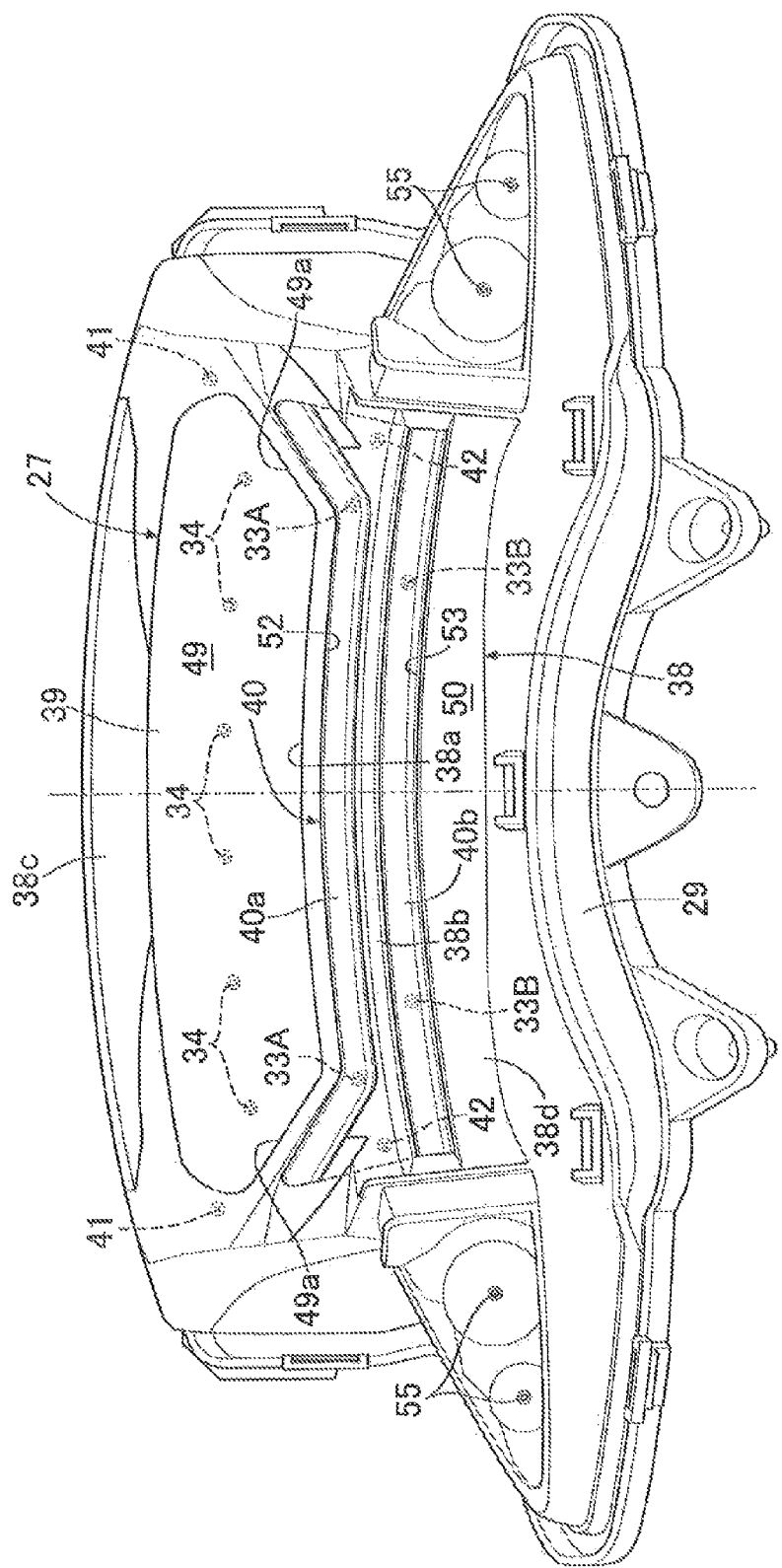
FIG. 3 is a view, corresponding to FIG. 2, in a state in which an outer lens is removed. (first embodiment)
Figure 4:
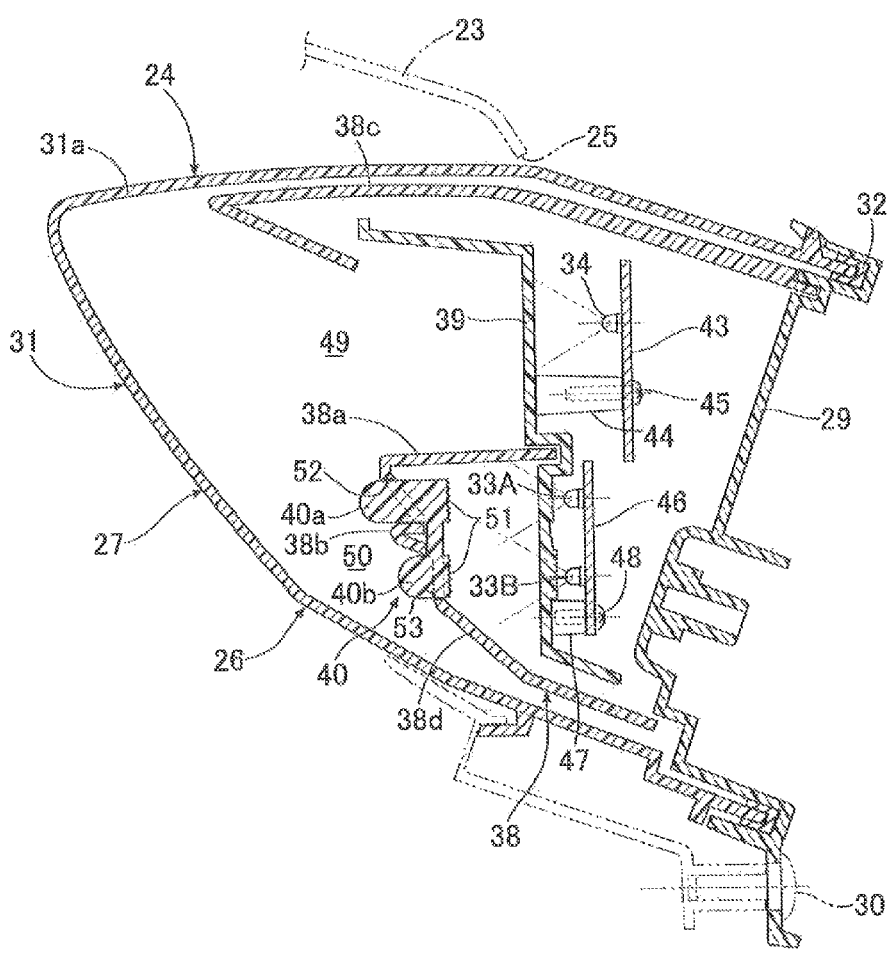
FIG. 4 is a sectional view along line 4-4 in FIG. 2. (first embodiment)
Figure 5:
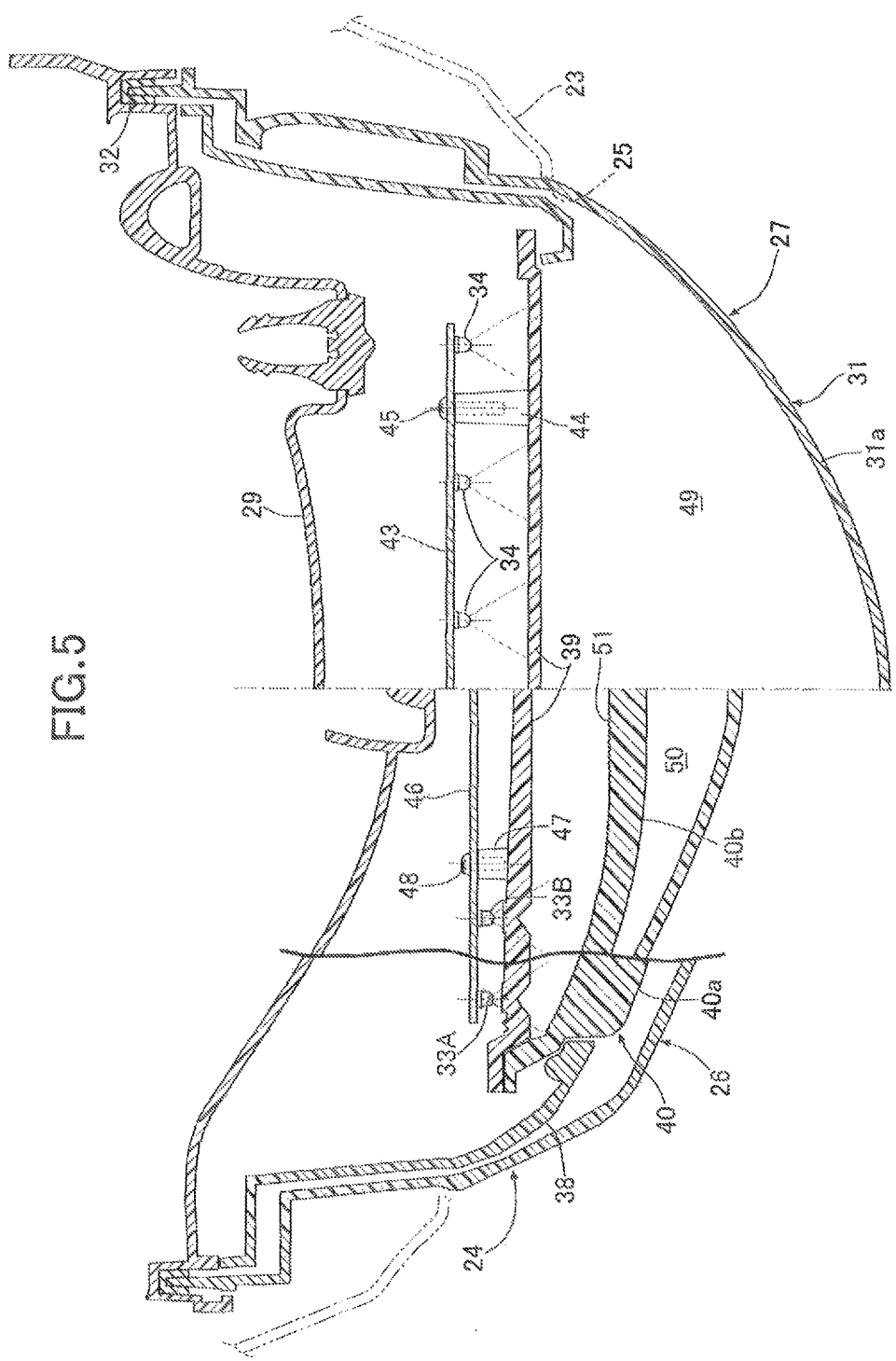
FIG. 5 is a sectional view along line 5-5 in FIG. 2. (first embodiment)

Referring in addition to FIG. 3 to FIG. 5, a base member 29, made of a synthetic resin, is fixed to a rear part of the vehicle body cover 23 while as clearly shown in FIG. 4 being secured by a plurality of screw members 30, and an outer lens 31 projecting rearward from an opening 25 provided in a rear end part of the vehicle body cover 23 is mounted on the base member 29 via a seal member 32.

Disposed within the outer lens 31 are a plurality of, for example four, tail lamp light sources 33A and 33B and a plurality of, for example six, stop lamp light sources 34 disposed above the tail lamp light sources 33A and 33B while being covered with the outer lens 31, which is common to these light sources 33A and 33B; 34, the tail lamp light sources 33A and 33B and the tail lamp light sources 34 being LEDs in this embodiment.

Figure 6:
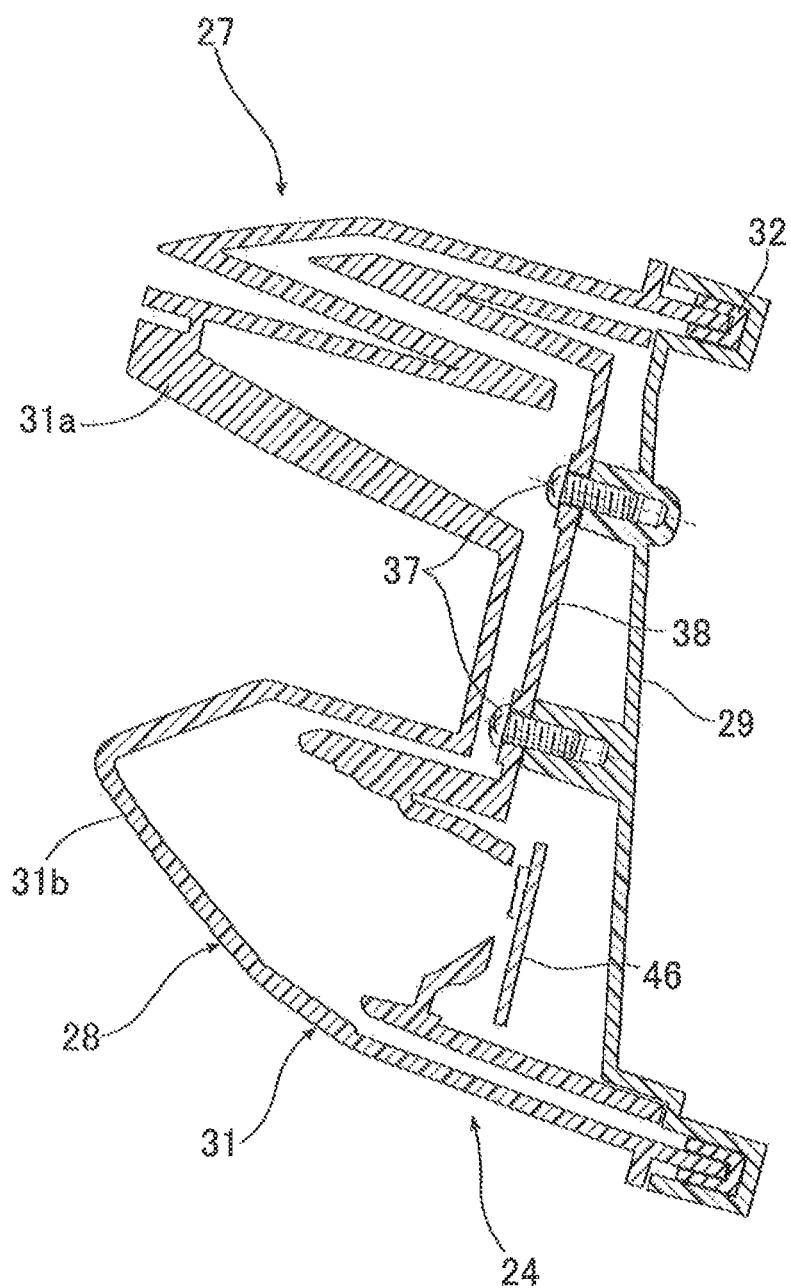
FIG. 6 is a sectional view along line 6-6 in FIG. 2. (first embodiment)

Disposed within the outer lens 31 as shown in FIG. 6 is a frame member 38 mounted on the base member 29 while being secured to the base member 29 by a plurality of screw members 37, and disposed within the outer lens 31 are a second inner lens 40 and a first inner lens 39 that covers the tail lamp light sources 33A and 33B and the stop lamp light sources 34 from the rear of the vehicle, the first inner lens 39 being common to these light sources 33A and 33B; 34, and the second inner lens 40 and the first inner lens 39 being supported by the frame member 38.

Figure 7:
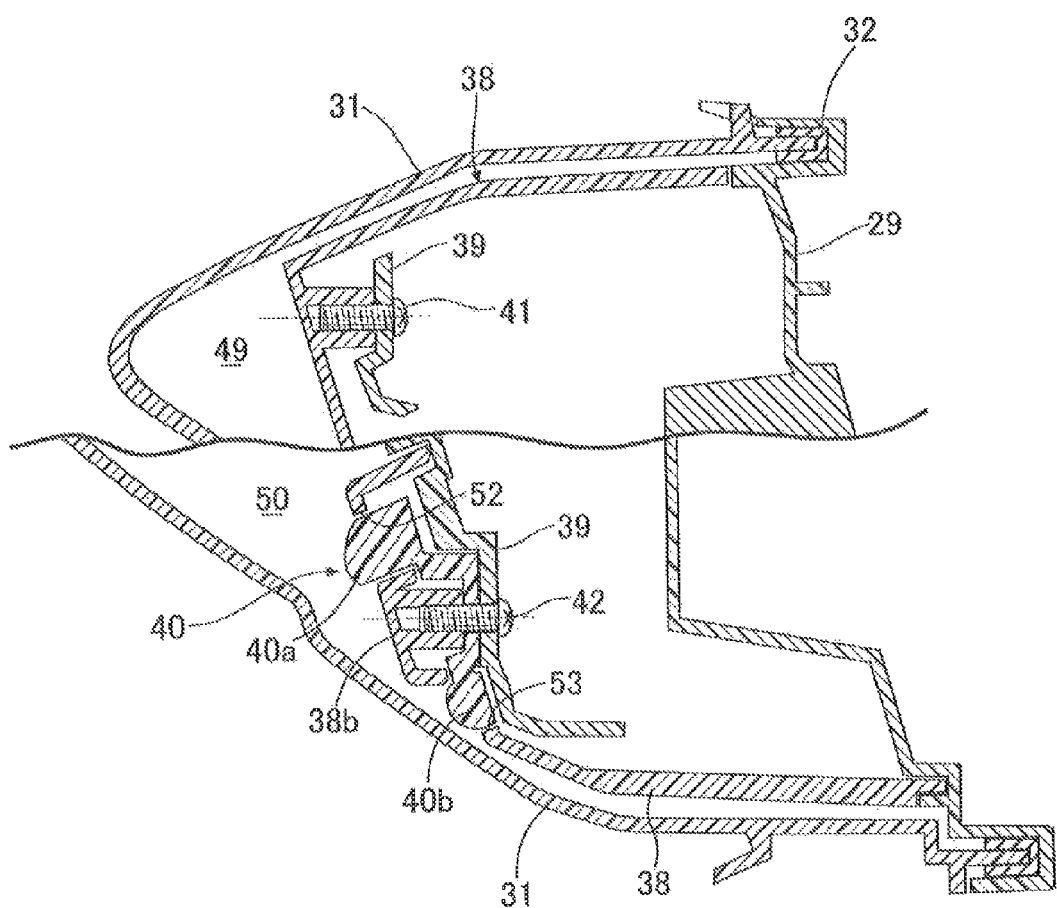
FIG. 7 is a sectional view along line 7-7 in FIG. 2. (first embodiment)

In FIG. 7, opposite end parts in the left-and-right direction of an upper part of the first inner lens 39 are mounted on the frame member 38 by screw members 41 and 41, and a lower part of the first inner lens 39 and opposite end parts in the left-and-right direction of the second inner lens 40 are mounted on the frame member 38 by being tightened together by screw members 42 and 42.

The six stop lamp light sources 34 are provided on a first board 43 so as to be arranged side by side in the horizontal direction at equal intervals in the vehicle width direction, and the first board 43 is secured by screw members 45 to a plurality of boss parts 44 provided on the first inner lens 39.

The four tail lamp light sources 33A and 33B are provided on a second board 46, and this second board 46 is secured by screw members 48 to a plurality of boss parts 47 provided on the first inner lens 39.

First tail lamp light sources 33A and 33A, which are two of the four tail lamp light sources 33A and 33B, are provided on the second board 46 so as to be slightly further inward in the vehicle width direction than two of the stop lamp light sources 34 and 34, of the six stop lamp light sources 34, that are disposed at the outer ends in the vehicle width direction and so as to be disposed lower than the stop lamp light sources 34 and 34, and second tail lamp light sources 33B and 33B, which are the remaining two, are provided on the second board 46 so as to be disposed lower than and further inward in the vehicle width direction than the first tail lamp light sources 33A and 33A.

The second inner lens 40 is subjected to processing so as to have a lower light transmittance than that of the first inner lens 39 and so as to diffuse light, and is formed so as to cover from the rear of the vehicle the first inner lens 39 in a region in which at least the first inner lens 39 and the tail lamp light sources 33A and 33B overlap when viewed from the rear of the vehicle while avoiding a region in which at least the first inner lens 39 and the stop lamp light sources 34 overlap when viewed from the rear of the vehicle.

The frame member 38 is provided with a first partition wall 38a that partitions from each other a stop lamp region 49 in which light from the stop lamp light sources 34 is transmitted only by the first inner lens 39 and goes toward the outer lens 31 side and a tail lamp region 50 in which light from the tail lamp light sources 33A and 33B is transmitted by the first and second inner lenses 39 and 40 and goes toward the outer lens 31 side. Moreover, the stop lamp region 49 is formed as clearly shown in FIG. 3 into an arc shape extending in the left-and-right direction so that vertically opposite edges thereof protrude upward.

That is, the stop lamp 27 is formed so that light from the stop lamp light sources 34 that has been transmitted by the first inner lens 39 is transmitted by the outer lens 31 via the stop lamp region 49, and the tail lamp 26 is formed so that light from the tail lamp light sources 33A and 33B that has been transmitted by the first and second inner lenses 39 and 40 is transmitted by the outer lens 31 via the tail lamp region 50.

A lens cut part 51 that diffuses light is formed on a surface, on the tail lamp light sources 33A and 33B side, of the second inner lens 40, and a surface, on the outer lens 31 side, of the second inner lens 40 is subjected to grained texturing so as to further diffuse light that has been diffused by the lens cut part 51. Moreover, the second inner lens 40 is formed so as to have an upper lens portion 40a and a lower lens portion 40b, which are formed as convex lenses, and the frame member 38 is provided with an upper slit 52 that makes the upper lens portion 40a project to the rear of the vehicle and a lower slit 53 that makes the lower lens portion 40b project to the rear of the vehicle, a second partition wall 38b being present between the slits 52 and 53. That is, the second inner lens 40 is partitioned into the upper lens portion 40a and the lower lens portion 40b by the frame member 38, and the upper lens portion 40a projects, as clearly shown in FIG. 4, further to the rear than the lower lens 40b.

The upper lens portion 40a is formed into an arc shape that is concave downward so as to follow the lower edge of the stop lamp region 49 while overlapping the first tail lamp light sources 33A and 33A when viewed from the rear of the vehicle. Furthermore, left and right edges 49a and 49a of the stop lamp region 49 are inclined so as to be positioned further outward in going upward, and left and right end parts of the upper lens portion 40a are formed so as to follow the left and right edges 49a and 49a of the stop lamp region 49.

Furthermore, the lower lens portion 40b is a line shape extending in the left-and-right direction so as to follow the lower edge of the upper lens portion 40a while overlapping the second tail lamp light sources 33B and 33B when viewed from the rear of the vehicle.

In a section corresponding to the stop lamp region 49 and the tail lamp region 50, a frame upper part 38c, which is present above the stop lamp light sources 34, of the frame member 38 projects, as is clearly shown in FIG. 4, further rearward than the first and second inner lenses 39 and 40 and a frame lower part 38d, which is present lower than the stop lamp light sources 34, as well as the first and second partition walls 38a and 38c.

Figure 8:
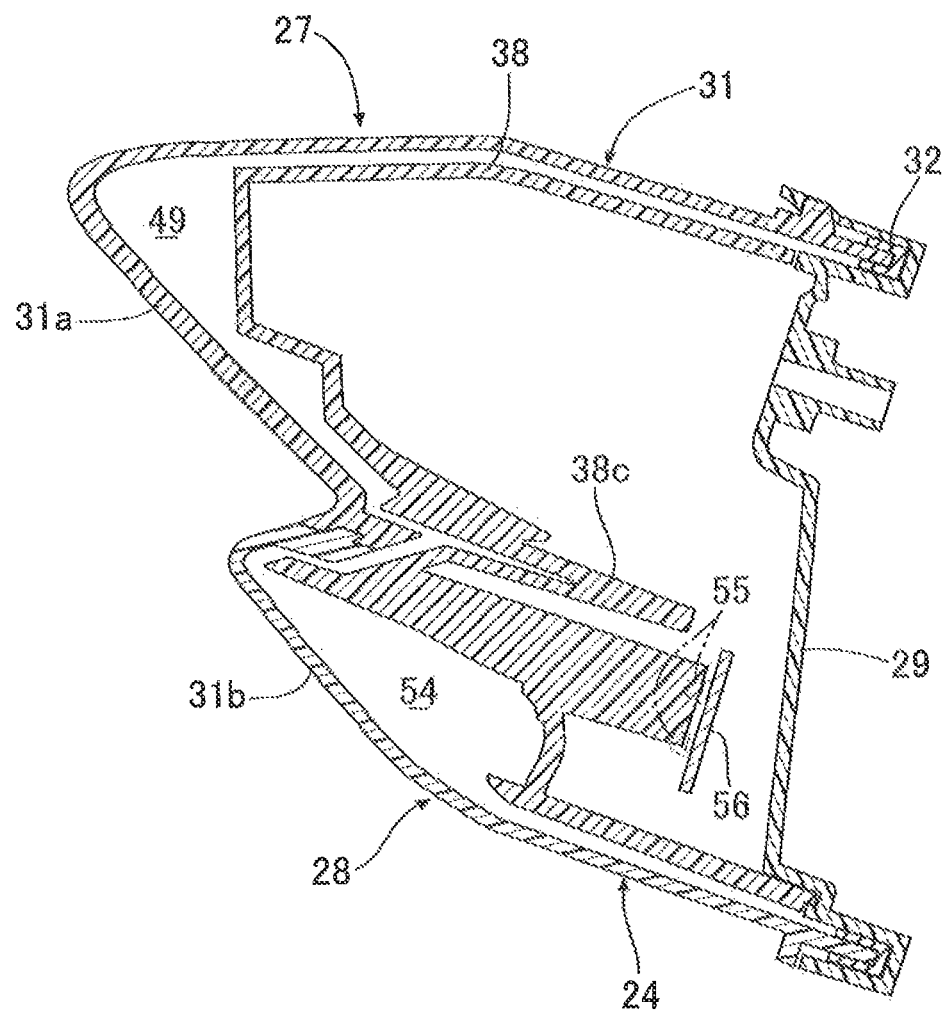
FIG. 8 is a sectional view along line 8-8 in FIG. 2. (first embodiment)
Figure 9:
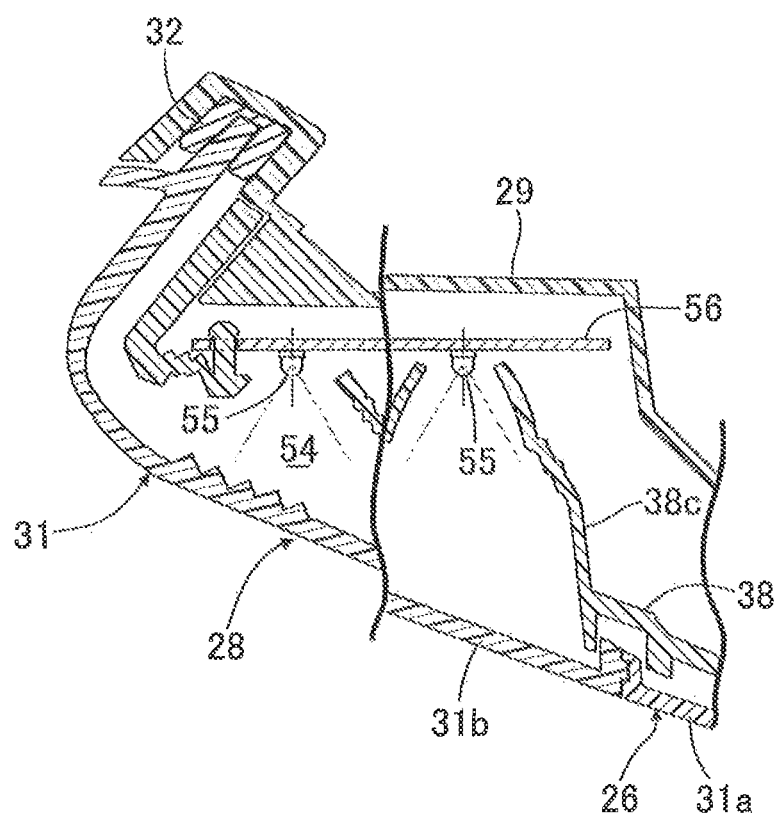
FIG. 9 is a sectional view along line 9-9 in FIG. 2. (first embodiment)

Referring in addition to FIG. 8 and FIG. 9, direction indicator regions 54, which are separated from the stop lamp region 49 and the tail lamp region 50 by a pair of left and right third partition walls 38c provided on the frame member 38, are formed on the left and right of the tail lamp region 50 within the outer lens 31, and direction indicator light sources 55, which are each a pair of LEDs, are disposed in the direction indicator regions 54 so as to each form the direction indicators 28 and 28 in cooperation with the outer lens 31. The pair of direction indicator light sources 54 and 54 are provided on a third board 56, the third board 56 being supported on the frame member 38.

Moreover, the direction indicators 28 and 28 are formed into a substantially triangular shape so that opposite end parts of the lower lens portion 40b are close to a middle part of one side of the triangle when viewed from the rear of the vehicle.

The outer lens 31 is formed by joining a pair of left and right direction indicator lens portions 31b and 31b, forming part of the direction indicators 28 and 28, to a lens main portion 31a, which is common to the stop lamp 27 and the tail lamp 26 and colored red, the direction indicator lens portions 31b and 31b being colorless.

The operation of this embodiment is now explained; since the first inner lens 39, which covers the tail lamp light sources 33A and 33B and the stop lamp light sources 34 from the rear of the vehicle and which is common to these light sources 33A and 33B; 34, and the second inner lens 40, which is subjected to processing so as to have a lower light transmittance than that of the first inner lens 39 and so as to diffuse light, are disposed within the outer lens 31, and the second inner lens 40 is formed so as to cover from the rear of the vehicle the first inner lens 39 in a region in which at least the first inner lens 39 and the tail lamp light sources 33A and 33B overlap when viewed from the rear of the vehicle while avoiding a region in which at least the first inner lens 39 and the stop lamp light sources 34 overlap when viewed from the rear of the vehicle, light from the tail lamp light sources 33A and 33B is transmitted by the first inner lens 39, the second inner lens 40, which has been subjected to processing so as to have a lower light transmittance than that of the first inner lens 39 and so as to diffuse light, and the outer lens 31 and shines rearward, light from the stop lamp light sources 34 is transmitted by the first inner lens 39 and the outer lens 31 and shines rearward, and it is therefore possible for the stop lamp 27 to shine rearward in a manner different from that of the tail lamp 28 and for turning on of the stop lamp 27 and the tail lamp 28 to be clearly differentiated by a factor other than the light intensity, thus enhancing the visibility.

Furthermore, since the frame member 38, which partitions from each other the stop lamp region 49, in which light from the stop lamp light sources 34 is transmitted only by the first inner lens 39 and goes toward the outer lens 31 side, and the tail lamp region 50, in which light from the tail lamp light sources 33A and 33B is transmitted by the first and second inner lenses 39 and 40 and goes toward the outer lens 31 side, is disposed within the outer lens 31, it is possible to clearly differentiate the tail lamp 26 and the stop lamp 27, and it is possible for a driver in a vehicle behind to clearly distinguish the tail lamp 26 from the stop lamp 27.

Moreover, since the second inner lens 40 is partitioned into the upper lens portion 40a and the lower lens portion 40b by the frame member 38, it is possible to make it appear as if there are two tail lamps 26, that is, an upper one and a lower one, thus enhancing the appearance.

Furthermore, since the surface of the second inner lens 40 is subjected to grained texturing, it is possible for light from the tail lamp light sources 33A and 33B to be transmitted by the second inner lens 40 and be diffused, thus making the entire second inner lens 40 shine.

Moreover, since the direction indicator regions 54, which are separated by the frame member 38 from the stop lamp region 49 and the tail lamp region 50, are formed on the left and right of the tail lamp region 50 within the outer lens 31, and the direction indicator light sources 55 are each disposed in these direction indicator regions 54, it is possible to form the direction indicators 28 and 28 so that they are clearly different from the stop lamp 27 and the tail lamp 26, and a driver in a vehicle behind can easily see that the direction indicators 28 and 28 are turned on.

Furthermore, since the upper lens portion 40a of the second inner lens 40 is formed so as to follow the lower edge of the stop lamp region 49, it is possible to emphasize the stop lamp 27 by the upper lens portion 40a, thus enhancing the visibility of the stop lamp 27.

Moreover, since the lower lens portion 40b of the second inner lens 40 is formed into a line shape extending in the left-and-right direction, and the direction indicators 28 and 28 each formed from the direction indicator light sources 55 and 55 and the outer lens 31 are formed into a substantially triangular shape so that the opposite end parts of the lower lens portion 40b are close to a middle part of one side of the triangle when viewed from the rear of the vehicle, it is possible to form an arrow-like shape from the lower lens portion 40b and the direction indicators 28 and 28, thus enabling the direction indicators 28 and 28 to be easily seen when they are turned on.

An embodiment of the present invention is explained above, but the present invention is not limited to the embodiment above and may be modified in a variety of ways as long as the modifications do not depart from the spirit and scope thereof.

The invention claimed is:

1. A rear combination lamp for a vehicle in which a tail lamp light source and a stop lamp light source disposed above the tail lamp light source are covered from the rear of the vehicle with an outer lens that is common to the light sources, wherein a first inner lens that covers from the rear of the vehicle the tail lamp light source and the stop lamp light source, the first inner lens being common to the light sources, and a second inner lens that is subjected to processing so as to have a lower light transmittance than that of the first inner lens and so as to diffuse light are disposed within the outer lens, and the second inner lens is formed so as to cover the first inner lens from the rear of the vehicle in a region in which at least the first inner lens and the tail lamp light source overlap when viewed from the rear of the vehicle while avoiding a region in which at least the first inner lens and the stop lamp light source overlap when viewed from the rear of the vehicle.

2. The rear combination lamp for a vehicle according to claim 1, wherein a frame member that partitions from each other a stop lamp region in which light from the stop lamp light source is transmitted only by the first inner lens and goes toward the outer lens side and a tail lamp region in which light from the tail lamp light source is transmitted by the first and second inner lenses and goes toward the outer lens side is disposed within the outer lens.

3. The rear combination lamp for a vehicle according to claim 2, wherein the second inner lens is partitioned into an upper lens portion and a lower lens portion by the frame member.

4. The rear combination lamp for a vehicle according to claim 1, wherein a surface, on the tail lamp light source side, of the second inner lens is subjected to grained texturing.

5. The rear combination lamp for a vehicle according to claim 2, wherein a direction indicator region is formed on the left and right of the tail lamp region within the outer lens, the direction indicator region being partitioned from the stop lamp region and the tail lamp region by the frame member, and a direction indicator light source being disposed in each direction indicator region.

6. The rear combination lamp for a vehicle according to claim 3, wherein the upper lens portion of the second inner lens is formed so as to follow a lower edge of the stop lamp region.

7. The rear combination lamp for a vehicle according to claim 5, wherein the lower lens portion of the second inner lens is formed into a line shape extending in a left-and-right direction, and a direction indicator formed from the direction indicator light source and the outer lens is formed into a substantially triangular shape so as to make opposite end parts of the lower lens portion close to a middle part of one side of the triangle when viewed from the rear of the vehicle.

8. The rear combination lamp for a vehicle according to claim 2, wherein a surface, on the tail lamp light source side, of the second inner lens is subjected to grained texturing.

9. The rear combination lamp for a vehicle according to claim 3, wherein a surface, on the tail lamp light source side, of the second inner lens is subjected to grained texturing.

* * * * *